US012647496B2

(12) United States Patent     (10) Patent No.:   US 12,647,496 B2

Sodagar     (45) Date of Patent:   *Jun. 2, 2026

(54) METHOD FOR APPLICATION CONTEXT TRANSFER BETWEEN EDGE SERVERS IN 5G NETWORKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,515

(22) Filed: May 20, 2024

(65) Prior Publication Data

US 2024/0305701 A1    Sep. 12, 2024

Related U.S. Application Data

(63) Continuation of application No. 17/979,399, filed on Nov. 2, 2022, now Pat. No. 12,021,949.

(60) Provisional application No. 63/275,370, filed on Nov. 3, 2021.

(51) Int. Cl.
*H04L 67/63*     (2022.01)
*H04L 67/141*     (2022.01)
*H04L 67/60*     (2022.01)

(52) U.S. Cl.
CPC ............ *H04L 67/63* (2022.05); *H04L 67/141* (2013.01); *H04L 67/60* (2022.05)

(58) Field of Classification Search
None
See application file for complete search history.

(56) References Cited

U.S. PATENT DOCUMENTS

| | | | | |
|---|---|---|---|---|
| 10,122,622 B2 * | 11/2018 | Wang | .................... | H04L 45/306 |
| 11,558,911 B2 * | 1/2023 | Kim | ........................ | H04W 4/50 |
| 2018/0227390 A1 | 8/2018 | Reznik et al. | | |

(Continued)

FOREIGN PATENT DOCUMENTS

| | | |
|---|---|---|
| WO | 2021/137579 A1 | 7/2021 |
| WO | 2023/020707 A1 | 2/2023 |

OTHER PUBLICATIONS

International Search Report issued Mar. 29, 2023 in International Application No. PCT/US 22/48784.

(Continued)

*Primary Examiner* — Jeffrey R Swearingen
(74) *Attorney, Agent, or Firm* — Sughrue Mion, PLLC

(57)         ABSTRACT

A method of transferring application context over a fifth-generation (5G) edge network, including: receiving, by a source edge enabler server (EES) from a source edge application server (EAS), a request to exchange application context data with a target EAS, wherein the application context data relates to an application which is to be transferred from the source EAS to the target EAS; transmitting the request from the source EES to a target EES; receiving, by the source EES from the target EES, a response including connection information for transferring the application context data; and transmitting the response to the source EAS, wherein the application context data is exchanged directly between the source EAS and the target EAS based on the connection information.

16 Claims, 5 Drawing Sheets

(56)          References Cited

U.S. PATENT DOCUMENTS

| | | | |
|---|---|---|---|
| 2019/0068622 | A1 | 2/2019 | Lin et al. |
| 2020/0128503 | A1 | 4/2020 | Li et al. |
| 2021/0058489 | A1 | 2/2021 | Kim et al. |
| 2021/0136177 | A1 | 5/2021 | Hall et al. |
| 2022/0030063 | A1* | 1/2022 | Gupta ................. H04L 67/1008 |
| 2022/0110022 | A1* | 4/2022 | Featherstone ......... H04W 28/12 |
| 2023/0108959 | A1* | 4/2023 | Kim ........................ H04W 8/00 |
| | | | 370/329 |
| 2023/0308853 | A1* | 9/2023 | Ding ........................ H04W 4/40 |
| 2023/0337056 | A1 | 10/2023 | Mas Rosique et al. |
| 2024/0031878 | A1* | 1/2024 | Rezagah ................. H04W 8/12 |

OTHER PUBLICATIONS

Written Opinion issued Mar. 29, 2023 in International Application No. PCT/US 22/48784.
3GPP TS 23.558 V17.1.0 (Sep. 2021) 3rd Generation Partnership Project; Technical Specification Group Services and System Aspects; Architecture for enabling Edge Applications; (Release 17), 162 pages.
3GPP TS 23.558 V 1.3.0 (Jan. 2021) Technical Specification 3rd Generation Partnership Project; Technical Specification Group Services and System Aspects; Architecture for enabling Edge Applications; (Release 17), 134 pp. (Year: 2021).
Extended European Search Report dated Dec. 12, 2024 in Application No. 22890756.4.

\* cited by examiner

200

Storage Component
240

Memory
230

Processor
220

Communication
Interface
270

Output
Component
260

Input
Component
250

Bus
210

Figure 5:
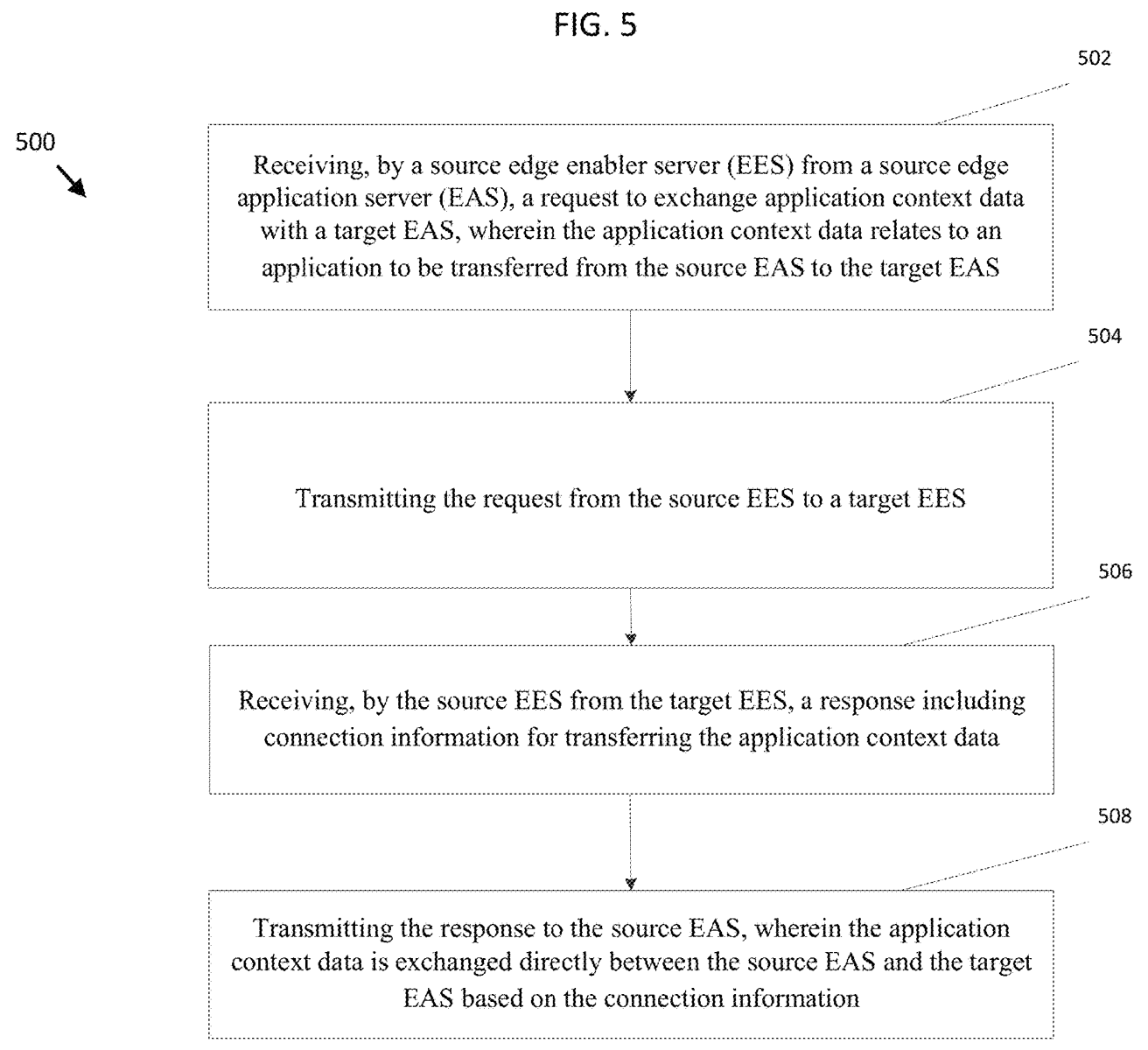

Receiving, by a source edge enabler server (EES) from a source edge application server (EAS), a request to exchange application context data with a target EAS, wherein the application context data relates to an application to be transferred from the source EAS to the target EAS

504

Transmitting the request from the source EES to a target EES

506

Receiving, by the source EES from the target EES, a response including connection information for transferring the application context data

508

Transmitting the response to the source EAS, wherein the application context data is exchanged directly between the source EAS and the target EAS based on the connection information

METHOD FOR APPLICATION CONTEXT TRANSFER BETWEEN EDGE SERVERS IN 5G NETWORKS

CROSS-REFERENCE TO RELATED APPLICATION

This application is a Continuation of U.S. application Ser. No. 17/979,399 filed Nov. 2, 2022, which claims priority from U.S. Provisional Application No. 63/275,370, filed on Nov. 3, 2021, in the United States Patent and Trademark Office, the disclosure of which is incorporated herein by reference in its entirety.

FIELD

The disclosure generally relates to 5th generation (5G) media streaming (5GMS), and, transferring the application context from one edge application server to another application server in 5G networks.

BACKGROUND

The fifth-generation (5G) standard for broadband networks allows for applications to be run on edge networks, enabling high bandwidth, low latency, and distributed processing.

The 3rd Generation Partnership Project (3GPP) TS23.558 (3rd Generation Partnership Project; Technical Specification Group Services and System Aspects; Architecture for enabling Edge Applications (Release 17), V2.0.0) defines the general architecture for enabling edge application, including the discovery of hardware capabilities of an edge element. 3GPP TS 26.501 (3GPP TS 26.501, 3rd Generation Partnership Project; Technical Specification Group Services and System Aspects; 5G Media Streaming (5GMS); General description and architecture (Release 16), V16.3.1) defines the general architecture for 5G media streaming applications and TS26.512 defines the application programming interface (API) calls for that architecture. 3GPP TR 26.803 (3rd Generation Partnership Project; Technical Specification Group Services and System Aspects; Study on 5G Media Streaming Extensions for Edge Processing (Release 17)V1.5.1) also relates to 5th generation media streaming (5GMS) and edge processing.

The 5G edge architecture defined in 3GPP TS23.558 only supports the transfer of actual data through 5G edge architecture and going through various hubs in that architecture. However, such a transfer might not be very efficient. The application servers in a network might have a more efficient direct connection.

SUMMARY

According to one or more embodiments, a method for transferring application context over a fifth-generation (5G) edge network includes: receiving, by a source edge enabler server (EES) from a source edge application server (EAS), a request to exchange application context data with a target EAS, wherein the application context data relates to an application which is to be transferred from the source EAS to the target EAS; transmitting the request from the source EES to a target EES; receiving, by the source EES from the target EES, a response including connection information for transferring the application context data; and transmitting the response to the source EAS, wherein the application context data is exchanged directly between the source EAS and the target EAS based on the connection information.

According to one or more embodiments, a device for transferring application context over a fifth-generation (5G) edge network includes at least one memory configured to store program code; and at least one processor configured to read the program code and operate as instructed by the program code, the program code including: first receiving code configured to cause the at least one processor to receive, by a source edge enabler server (EES) from a source edge application server (EAS), a request to exchange application context data with a target EAS, wherein the application context data relates to an application which is to be transferred from the source EAS to the target EAS; first transmitting code configured to cause the at least one processor to transmit the request from the source EES to a target EES; second receiving code configured to cause the at least one processor to receive, by the source EES from the target EES, a response including connection information for transferring the application context data; and second transmitting code configured to cause the at least one processor to transmit the response to the source EAS, wherein the application context data is exchanged directly between the source EAS and the target EAS based on the connection information.

According to one or more embodiments, a non-transitory computer-readable medium stores instructions includes: one or more instructions that, when executed by one or more processors of a device for transferring application context over a fifth-generation (5G) edge network, cause the one or more processors to: receive, by a source edge enabler server (EES) from a source edge application server (EAS), a request to exchange application context data with a target EAS, wherein the application context data relates to an application which is to be transferred from the source EAS to the target EAS; transmit the request from the source EES to a target EES; receive, by the source EES from the target EES, a response including connection information for transferring the application context data; and transmit the response to the source EAS, wherein the application context data is exchanged directly between the source EAS and the target EAS based on the connection information.

BRIEF DESCRIPTION OF THE DRAWINGS

Further features, the nature, and various advantages of the disclosed subject matter will be more apparent from the following detailed description and the accompanying drawings in which:

FIG. 5 is a flowchart of an example process for transferring application context, according to embodiments.

DETAILED DESCRIPTION

Figure 1:
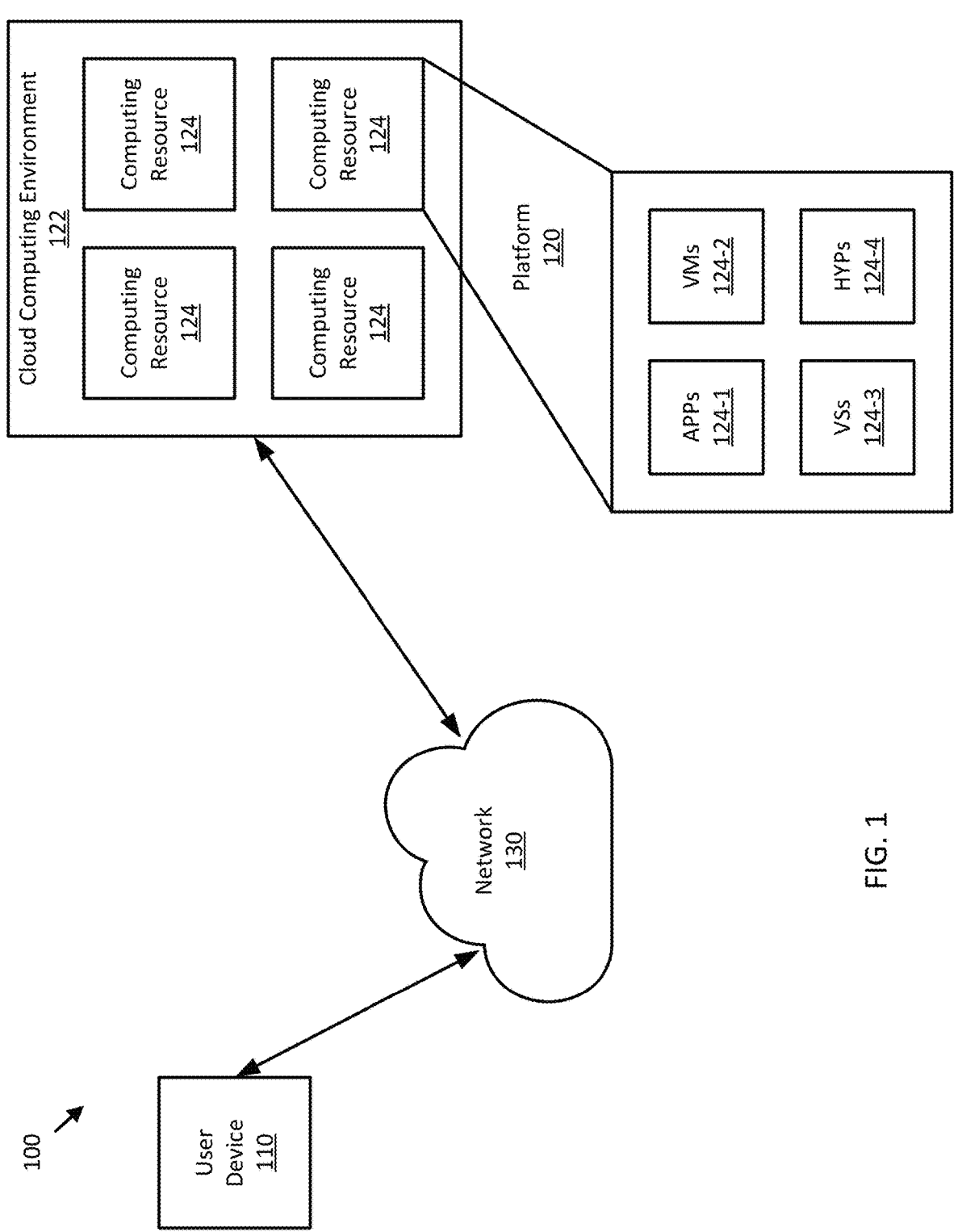
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
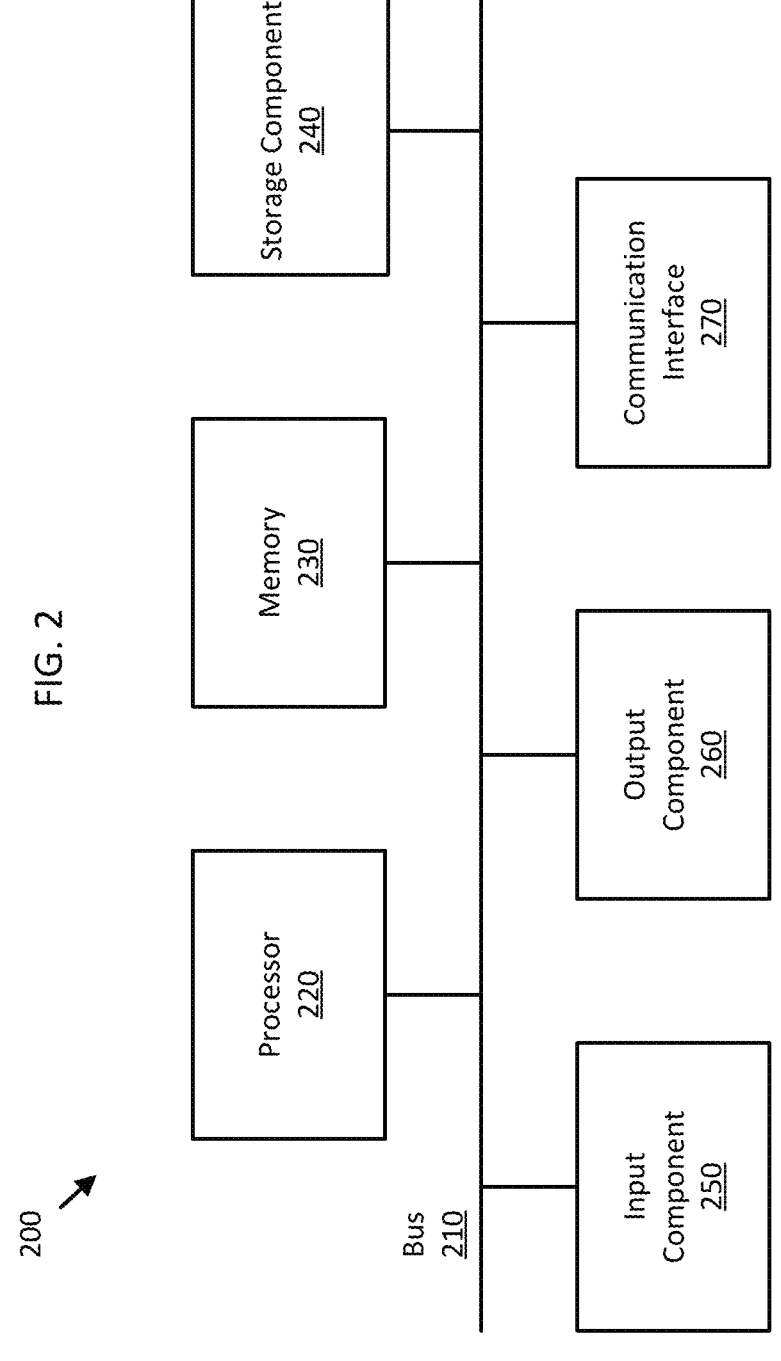
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
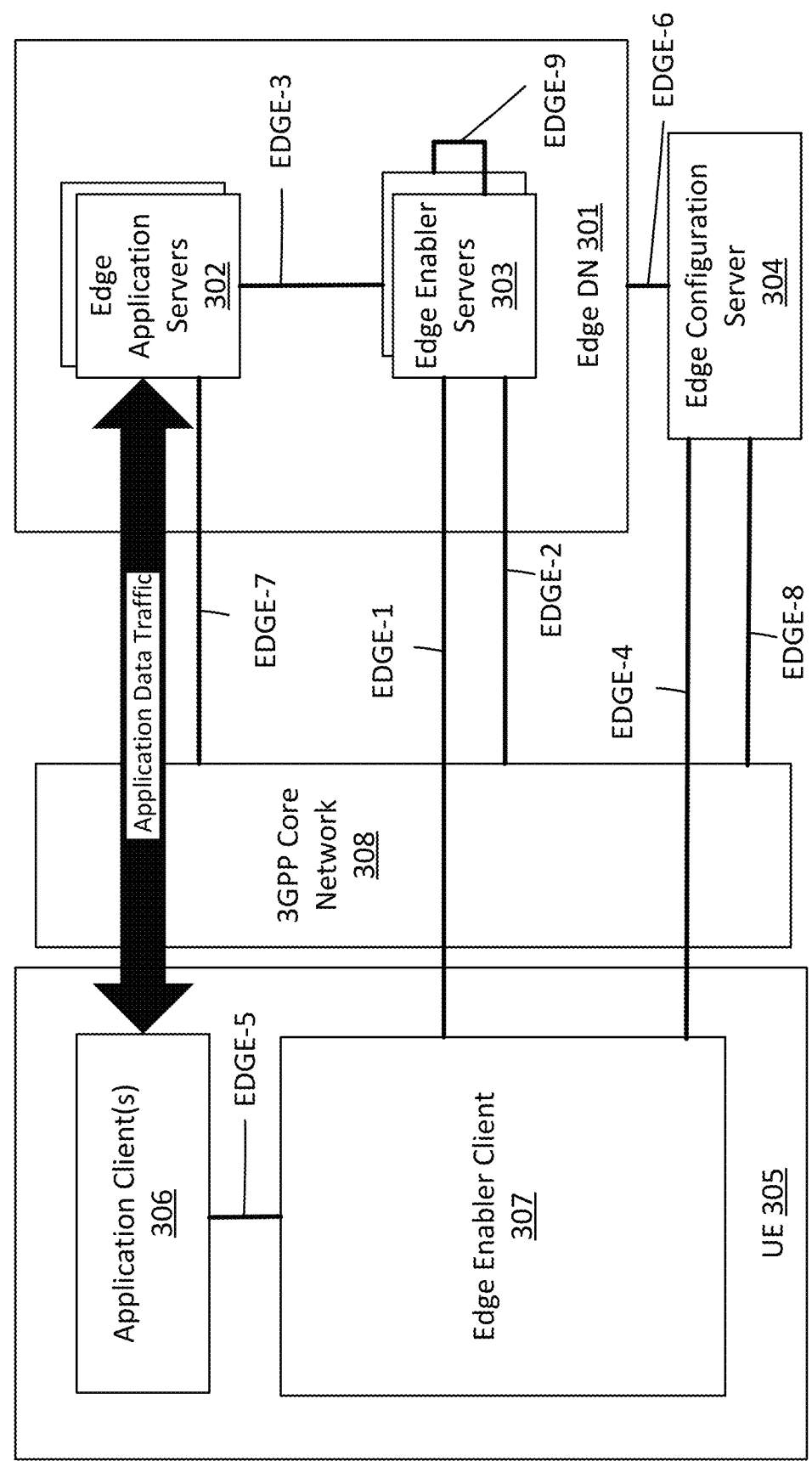
FIG. 3 is a diagram of a 5th generation (5G) edge network architecture, according to embodiments.

FIG. 3 is a diagram of a 5G edge network architecture 300, according to embodiments. Edge Data Network (EDN) 301 is a local Data Network. One or more Edge Application Servers (EASs) 302 and one or more Edge Enabler Servers (EESs) 303 are contained within the EDN 301. In embodiments, the one or more EASs 302 may include source EAS 302a and target EAS 302b, and the one or more EESs 303 may include source EES 303a and target EES 303b, as discussed in greater detail below with respect to FIG. 3. In embodiments, the one or more EESs 303 may communicate with each other using link EDGE-9. Edge Configuration Server (ECS) 304 provides configurations related to EES 303, including details of EDN 301 hosting EES 303. User Equipment (UE) 305 contains Application Client (AC) 306 and Edge Enabler Client (EEC) 307. EAS 302, EES 303 and ECS 304 may interact with the 3GPP Core Network 308.

EES 303 provides supporting functions needed for EAS 302 and EEC 307. Functionalities of EES 303 may include: provisioning of configuration information to EEC 307, enabling exchange of application data traffic with EAS; supporting the functionalities of API invoker and API exposing function, for example as specified in 3GPP TS 23.222; interacting with 3GPP Core Network 308 for accessing the capabilities of network functions either directly (e.g. via PCF) or indirectly (e.g. via Service Capability Exposure Function (SCEF)/NEF/SCEF+NEF); supporting the functionalities of application context transfer; supporting external exposure of 3GPP network and service capabilities to EASs 302 over link EDGE-3; supporting the functionalities of registration (i.e., registration, update, and de-registration) for EEC 307 and EAS; and supporting the functionalities of triggering EAS 302 instantiation on demand.

EEC 307 provides supporting functions needed for AC. Functionalities of EEC 307 may include: retrieval and provisioning of configuration information to enable the exchange of Application Data Traffic with EAS 302; and discovery of EASs 302 available in the EDN 301.

ECS 304 provides supporting functions needed for the EEC 307 to connect with an EES 303. Functionalities of ECS 304 are: provisioning of Edge configuration information to the EEC 307, for example the information for the EEC 307 to connect to the EES 303 (e.g. service area information applicable to LADN); and the information for establishing a connection with EESs 303 (such as URI); supporting the functionalities of registration (i.e., registration, update, and de-registration) for the EES 303; supporting the functionalities of API invoker and API exposing function as specified in 3GPP TS 23.222; and interacting with 3GPP Core Network 308 for accessing the capabilities of network functions either directly (e.g. PCF) or indirectly (e.g. via SCEF/NEF/SCEF+NEF).

AC 306 is the application resident in the UE 305 performing the client function.

EAS 302 is the application server resident in the EDN 301, performing the server functions. The AC 306 connects to EAS 302 in order to avail the services of the application with the benefits of Edge Computing. It is possible that the server functions of an application are available only as an EAS 302. However, it is also possible that certain server functions are available both at the edge and in the cloud, as an EAS 302 and an Application Server resident in the cloud respectively. The server functions offered by an EAS 302 and its cloud Application Server counterpart may be the same or may differ; if they differ, the Application Data Traffic exchanged with the AC may also be different. EAS 302 may consume the 3GPP Core Network 308 capabilities in different ways, such as: it may invoke 3GPP Core Network 308 function APIs directly, if it is an entity trusted by the 3GPP Core Network 308; it may invoke 3GPP Core Network 308 capabilities through EES 303; and it may invoke the 3GPP Core Network 308 capability through the capability exposure functions e.g., SCEF or NEF.

Architecture 300 may include a number of different interfaces for enabling edge applications, which may be referred to as reference points. For example, link EDGE-1 may be a reference point which enables interactions between the EES 303 and the EEC 307. It supports: registration and de-registration of EEC 307 to EES 303; retrieval and provisioning of EAS 302 configuration information; and discovery of EASs 302 available in the EDN 301.

Link EDGE-2 may be a reference point which enables interactions between EES 303 and the 3GPP Core Network 308. It supports: access to 3GPP Core Network 308 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; or with EES 303 deployed within the MNO trust domain (see 3GPP TS 23.501 clause 5.13, 3GPP TS 23.503, 3GPP TS 23.682). Link EDGE-2 may reuse 3GPP reference points or interfaces of EPS or 5GS considering different deployment models.

Link EDGE-3 may be a reference point which enables interactions between EES 303 and EASs 302. It supports: registration of EASs 302 with availability information (e.g. time constraints, location constraints); de-registration of EASs 302 from EES 303; discovery of target EAS 302 information to support application context transfer; providing access to network capability information (e.g. location information, Quality of Service (QOS) related information); and requesting the setup of a data session between AC and EAS 302 with a specific QoS.

Link EDGE-4 may be a reference point which enables interactions between ECS 304 and EEC 307. It supports: provisioning of Edge configuration information to the EEC 307.

Link EDGE-5 may be a reference point which enables interactions between AC and EEC 307.

Link EDGE-6 may be a reference point which enables interactions between ECS 304 and EES 303. It supports: registration of EES 303 information to ECS 304.

Link EDGE-7 may be a reference point which enables interactions between EAS 302 and the 3GPP Core Network 308. It supports: access to 3GPP Core Network 308 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; or with EAS 302 deployed within the MNO trust domain (see 3GPP TS 23.501 clause 5.13, 3GPP TS 23.682). Link EDGE-7 may reuse 3GPP reference points or interfaces of EPS or 5GS considering different deployment models.

Link EDGE-8 may be a reference point which enables interactions between the ECS 304 and the 3GPP Core Network 308. It supports: a) access to 3GPP Core Network 308 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; and with the ECS 304 deployed within the MNO trust domain (see 3GPP TS 23.501 clause 5.13, 3GPP TS 23.682). Link EDGE-8 may reuse 3GPP reference points or interfaces of EPS or 5GS considering different deployment models.

The AC 306 may send an inquiry to the EES 303 through the EEC 307, to discover the suitable EASs. In this inquiry, the AC 306 includes EAS discovery filters that define the desired characteristics of the suitable EAS. In the response, the EEC 307 provides the AC 306 the list of matching EASs and some of their characteristics. The AC 306 then selects the best EAS from the list.

In the above architecture, depending on the UE's location change, or required change of resources, the applications running on one of the EASs 302, for example the source EAS 302*a*, may need to be transferred or otherwise moved to another of the EASs 302, for example target EAS 302*b*. In such a case, because the running application in the source EAS 302*a* has some context, the context needs to be transferred to the Target EAS (target EAS 302*b*).

The 5G edge architecture defined in 3GPP TS23.558 defines a method for transfer that goes through two hubs:

Source EAS 302*a*→Source EES 304*a*→Target EES 304*b*→Target EAS 302*b*

The EDGE-9 API provides the mechanism for such transfer. However, in this approach, the actual application context data, which might be large, has to be transferred through the above path.

Accordingly, embodiments may provide a method of transfer by reference. In this case, the connection information used for the transfer between the source EAS 302*a* and the target EAS 302*b* may be exchanged through the source EES 304*a* and the target EES 304*b*, but the actual data transfer may occur between the source EAS 302*a* and target EAS 302*b* directly. As a result, embodiments may provide a mechanism to signal the connection information between two application servers, for example two EASs 302, without taking the burden of data transfer.

Figure 4:
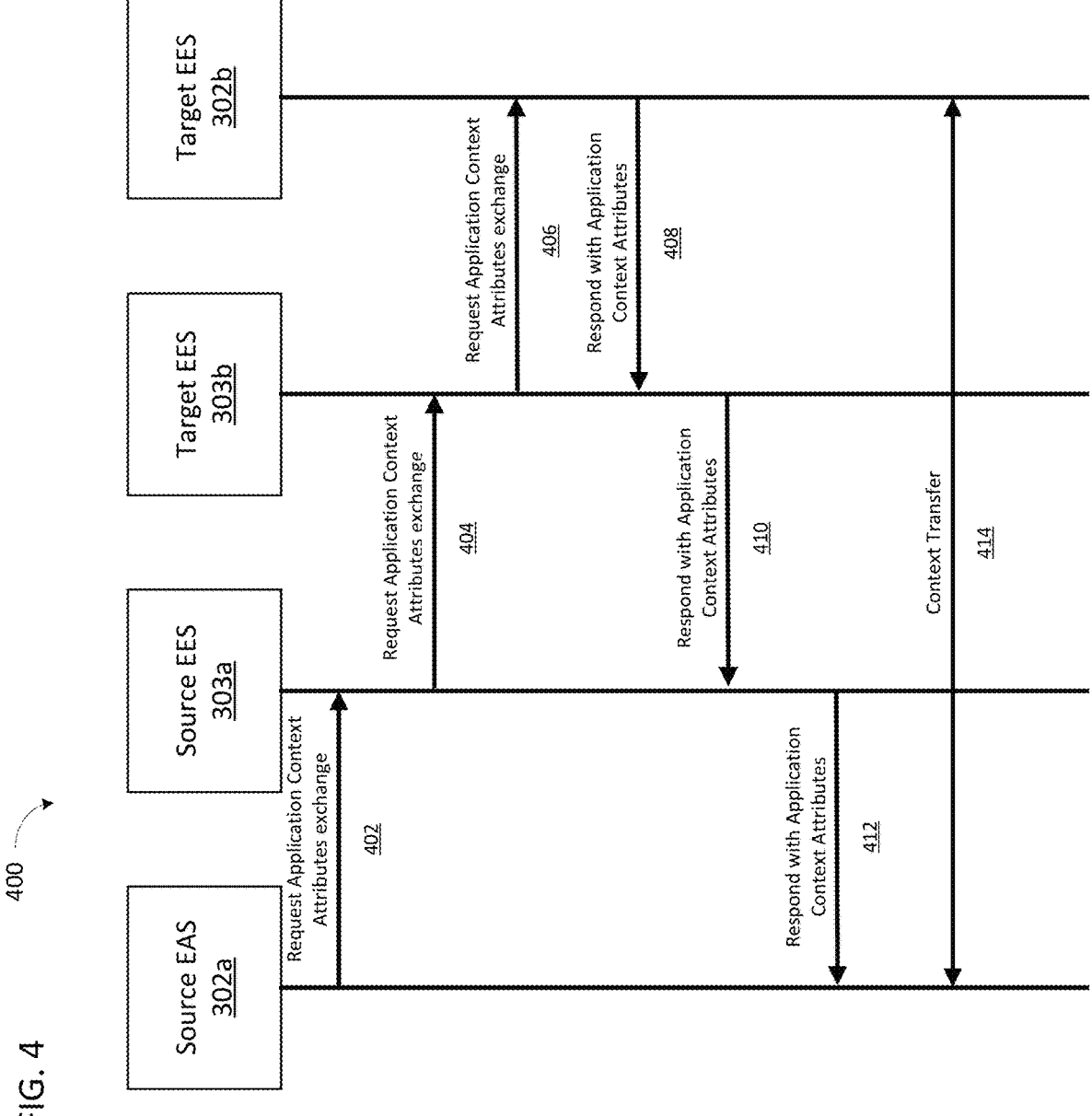
FIG. 4 is a flowchart of an example process for transferring application context, according to embodiments.

In this case, one of the following information may be provided as the connection information, which may also be referred to as application context attributes:

1. From the source EAS 302*a* to the target EAS 302*b*:
   a. The source address of the Application Context storage
   b. The unique Application Context ID
   c. The supported protocols
   d. Security information
   e. Expiration time
2. From the target EAS 302*b* to the source EAS 302*a*:
   a. The target address of the Application Context storage
   b. The unique Application Context ID
   c. The supported protocols
   d. Security information
   e. Expiration time In embodiments, information c, d, and e, and any additional information may be stored in a scheme, and a scheme identifier may be used to signal the scheme. For example, in embodiments, the following information may be provided:

1. From the source EAS 302*a* to the target EAS 302*b:*
a. The source address of the Application Context storage
b. The unique Application Context ID
c. Scheme-identifier
d. Scheme
2. From the target EAS 302*b* to the source EAS 302*a:*
a. The target address of the Application Context storage
b. The unique Application Context ID
c. Scheme-identifier
d. Scheme FIG. 4 is a flowchart of an example process 400 for transferring application context, according to embodiments. As shown in FIG. 4, at operation 402, the source EAS 302*a* may transmit a request to the source EES 303*a*. In embodiments, the request may include a request to exchange application context attributes with the target EAS 302*b*. In embodiments, the context attributes may correspond to, or include, the connection information. At operation 404, the source EES 303*a* may transmit the request to the target EES 303*b*. In embodiments, the source EES 303*a* and the target EES 303*b* may communicate using link EDGE-9. At operation 406, the target EES 303*b* may transmit the request to the target EAS 302*b*. At operation 408, the target EAS 302*b* may respond by transmitting a response including the context attributes and/or the connection information to the target EES 303*b*. At operation 410, the target EES may transmit the response to the source EES 303*a*. At operation 412, the source EES 303*a* may transmit the response to the source EAS 302*a*. At operation 414, the source EAS 302*a* may use the information in the response, for example the context attributes and/or the connection information, to transfer the context, for example the application context data, to the target EAS 302*b*.

Therefore, the context attributes and/or the connection information may be exchanged between the source EAS 302*a* and target EAS 302*b* through the source EES 304*a* and the target EES 304*b* through the EDGE-9 interface, and the actual data transfer of the application context may occur between the source EAS 302*a* and target EAS 302*b* directly. Therefore, in embodiments the context attributes may be exchanged using the edge network, and the actual data transfer corresponding to the application context data may be exchanged using a different network.

In embodiments, the connection information may be stored in a RESTFUL resource. The resource may contain all of the information for the transferring-from or the transferring-to point including a uniform resource locator (URL), protocols such as Hypertext Transfer Protocol (HTTP) POST or GET, required authentication and/or encryption/decryption for the transfer, as well as expiration time, the capture time of the application context, and the unique ID for the application context. The RESTFUL resource may be, for example, a JavaScript Object Notation (JSON) object that contains such information.

Therefore, in embodiments the connection information may be small, and the transfer of such information may be efficient and quick. In embodiments, the application context transfer may occur using a preferred protocol between two source and target application servers, for example two of the EASs 302, therefore the transfer speed may be more efficient. In embodiments, the connection information may be updated before the actual transfer of data. In this case, the cost of the update is minimal.

Accordingly, embodiments may provide application context transfer information in 5G edge networks, wherein the connection information for transferring the application content data is transferred through 5G edge network and its enabler servers while the actual transfer of data occurs directly between two edge application servers, wherein the connection information provides source or destination for application context data, as well as supported protocols, the context unique ID, the security, and authentication information and the expiration date and time for transfer and any other additional information. In addition, embodiments may provide a RESTFUL resource for the connection information, wherein the data is stored in a RESTFUL resource and HTTP methods are used to send, retrieve, update and delete it.

FIG. 5 is a flowchart is an example process 500 for enabling edge applications, according to embodiments. In some implementations, one or more process blocks of FIG. 5 may be performed by any of the elements discussed above with respect to FIGS. 1-4.

As shown in FIG. 5, process 500 may include receiving, by a source edge enabler server (EES) from a source edge application server (EAS), a request to exchange application context data with a target EAS, wherein the application context data relates to an application which is to be transferred from the source EAS to the target EAS (block 502). In embodiments, the source EES may correspond to source EES 303*a*, the source EAS may correspond to source EAS 302*a*, the target EES may correspond to target EES 303*b*, and the target EAS may correspond to target EAS 302*b*.

As further shown in FIG. 5, process 500 may include transmitting the request from the source EES to a target EES (block 504).

As further shown in FIG. 5, process 500 may include receiving, by the source EES from the target EES, a response including connection information for transferring the application context data (block 506).

As further shown in FIG. 5, process 500 may include transmitting the response to the source EAS (block 508). In embodiments, the application context data may be exchanged directly between the source EAS and the target EAS based on the connection information In embodiments, the request and the response may be transmitted using the 5G edge network, and the application context data may be not exchanged over the 5G edge network.

In embodiments, the request may be transmitted from the source EES to the target EES using an EDGE-9 interface, and the response may be transmitted from the target EES to the source EES using the EDGE-9 interface.

In embodiments, the request may include at least one from among a source address for a storage corresponding to the application context data, an application context identifier corresponding to the application context data, at least one protocol supported by the source EAS, an expiration time associated with the request, and security information associated with the request.

In embodiments, the connection information may include at least one from among a target address for a storage corresponding to the application context data, an application context identifier corresponding to the application context data, at least one protocol supported by the target EAS, an expiration time associated with at least one of the request and the response, and security information associated with at least one of the request and the response.

In embodiments, at least one of the request and the response may include a scheme identifier which is used to signal a scheme corresponding to the application context data.

In embodiments, the connection information may be stored in a RESTFUL resource, and the RESTFUL resource may include hypertext transfer protocol (HTTP) information for exchanging the application context data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of transferring application context with a fifth- generation (5G) edge network, the method being performed by at least one processor and comprising:

receiving, by a source edge enabler server (S-EES) from a source edge application server (S-EAS), a request to exchange application context data with a target EAS (T-EAS); and application context data relates to an application which is to be transferred from the S-EAS to the T-EAS;

transmitting the request from the S-EES to a T-EES;

receiving, by the S-EES from the T-EES, a response including information for transferring the application context data;

transmitting the response to the source EAS; and exchanging the application context data directly from the S-EAS and to the T-EAS, the .

2. The method of claim 1, wherein exchanging the application context data is based on the connection information.

3. The method of claim 2, wherein the request and the response are transmitted using the 5G edge network, and wherein the application context data is not exchanged over the 5G edge network.

4. The method of claim 2, wherein the request is transmitted from the S-EES to the T-EES using an EDGE interface, and wherein the response is transmitted from the T-EES to the S-EES using the EDGE interface.

5. The method of claim 2, wherein the request includes at least one from among a source address for a storage corresponding to the application context data, an application context identifier corresponding to the application context data, at least one protocol supported by the S-EAS, an expiration time associated with the request, and security information associated with the request.

6. The method of claim 2, wherein the connection information includes at least one from among a target address for a storage corresponding to the application context data, an application context identifier corresponding to the application context data, at least one protocol supported by the T-EAS, an expiration time associated with at least one of the request and the response, and security information associated with the at least one of the request and the response.

7. The method of claim 2, wherein at least one of the request and the response includes a scheme identifier which is used to signal a scheme corresponding to the application context data.

8. The method of claim 2, wherein the connection information is stored in a RESTFUL resource, and wherein the RESTFUL resource includes hypertext transfer protocol (HTTP) information for exchanging the application context data, wherein the RESTFUL resource further includes URL information, authentication information, encryption/decryption information, an expiration time, a capture time of the application context, and an ID of the application context.

9. A device for transferring application context with a fifth-generation (5G) edge network, the device comprising:

at least one memory configured to store program code; and at least one processor configured to read the program code and operate as instructed by the program code, the program code including:

first receiving code configured to cause the at least one processor to receive, by a source edge enabler server (S-EES) from a source edge application server (S-EAS), a request to exchange application context data with a target EAS (T-EAS)), the application context data relates to an application which is to be transferred from the S-EAS to the T-EAS;

first transmitting code configured to cause the at least one processor to transmit the request from the S-EES to a T-EES;

second receiving code configured to cause the at least one processor to receive, by the S-EES from the T-EES, a response including connection information for transferring the application context data; and second transmitting code configured to cause the at least one processor to transmit the response to the S-EAS;

exchanging code configured to cause the at least one processor to exchange the application context data directly from the S-EAS and to the T-EAS.

10. The device of claim 9, wherein exchanging the application context data is based on the connection information.

11. The device of claim 10, wherein the request and the response are transmitted using the 5G edge network, and wherein the application context data is not exchanged over the 5G edge network.

12. The device of claim 10, wherein the request is transmitted from the S-EES to the T-EES using an EDGE interface, and wherein the response is transmitted from the T-EES to the S-EES using the EDGE interface.

13. The device of claim 10, wherein the request includes at least one from among a source address for a storage corresponding to the application context data, an application context identifier corresponding to the application context data, at least one protocol supported by the S-EAS, an expiration time associated with the request, and security information associated with the request.

14. The device of claim 10, wherein the connection information includes at least one from among a target address for a storage corresponding to the application context data, an application context identifier corresponding to the application context data, at least one protocol supported by the T-EAS, an expiration time associated with at least one of the request and the response, and security information associated with the at least one of the request and the response.

15. The device of claim 10, wherein at least one of the request and the response includes a scheme identifier which is used to signal a scheme corresponding to the application context data, wherein the connection information is stored in a RESTFUL resource, and wherein the RESTFUL resource includes hypertext transfer protocol (HTTP) information for exchanging the application context data.

16. A non-transitory computer-readable medium storing instructions, the instructions comprising: one or more instructions that, when executed by one or more processors of a device for transferring application context with a fifth-generation (5G) edge network, cause the one or more processors to:

receive, by a source edge enabler server (S-EES) from a source edge application server (S-EAS), a request to exchange application context data with a target EAS (T-EAS), wherein the application context data relates to an application which is to be transferred from the S-EAS to the T-EAS, the application context data relates to an application which is to be transferred from the S-EAS to the T-EAS;

transmit the request from the S-EES to a T-EES;

receive, by the S-EES from the T-EES, a response including information for transferring the application context data;

transmit the response to the source EAS; and exchange the application context data directly from the S-EAS and to the T-EAS.

\* \* \* \* \*